J. SHAW.
PRODUCTION OF MOTION PICTURES IN COLORS.
APPLICATION FILED APR. 5, 1919 RENEWED JUNE 7, 1921.

1,402,669.

Patented Jan. 3, 1922.

WITNESSES

INVENTOR
JOSEPH SHAW
BY
ATTORNEYS

UNITED STATES PATENT OFFICE.

JOSEPH SHAW, OF NEW YORK, N. Y., ASSIGNOR TO RAINBOW PICTURES CORPORATION, OF NEW YORK, N. Y., A CORPORATION OF NEW YORK.

PRODUCTION OF MOTION PICTURES IN COLORS.

1,402,669. Specification of Letters Patent. Patented Jan. 3, 1922.

Application filed April 5, 1919, Serial No. 287,667. Renewed June 7, 1921. Serial No. 475,833.

*To all whom it may concern:*

Be it known that I, JOSEPH SHAW, a citizen of the United States, and a resident of the city of New York, borough of the Bronx, in the county of Bronx and State of New York, have invented new and useful Improvements in the Production of Motion Pictures in Colors, of which the following is a full, clear, and exact description.

The invention relates to color motion pictures and has particular reference to methods in which the negative color selected image records are obtained with the aid of color filters in an ordinary taking camera on a single coated panchromatic negative film and positive records are printed therefrom on a double-coated positive film whereupon the positive images are colored into their respective colors and projected without the aid of any color filters.

The main object of the invention is to obtain, in an ordinary taking camera with the aid of color filters, ample exposures upon a panchromatic negative film whereby color record or film having exceedingly fine images containing minute details of color selection are produced. Another object is to permit of reproducing the normal phase of action or life-like effects in color when from such films positive records are printed on a double-coated positive film and projected at a normal rate of speed or about sixteen pictures per second.

It is a general practice by those using the double coated positive film, to print from the negative in such a manner that the images of one wave length, for instance, green, are imprinted on one side of the sensitized coating of the film, and images of another wave length, for instance, red, imprinted on the other side of a similar coating of the film; thus the images of short wave and long wave lengths are in adjacent registry, the positive being one-half the length of the negative record, and whereas in the negative each individual picture area presents an aspect of one phase of action in the double coated positive film after such printing, each picture area in adjacent registry combined contains two phases of action.

Now, for faithful reproduction of motion, it is imperative that the exact speed of every phase of action registered in the negative film should be maintained at the same ratio in projection, otherwise the phase of action may appear either accelerated, if the speed in the projection of the positive is faster than the one used in taking the negative record, or will appear retarded if the projection is slower than the taking.

It will be clear from the above that in order to reproduce a normal phase of action of the object in projection of a regularly printed single coated positive film bearing all the images on one side of the film only and each picture area representing one phase of action, the projection speed must be precisely the same as the one used in taking the pictures, yet in the projection of the double coated positive film printed as explained, where two phases of action are combined in adjacent registry in one picture area, normal speed of action can only be obtained if the projection speed, in ratio, is one-half of the speed used in taking the picture; for instance, if negative image records are taken at the rate of thirty-two pictures per second, in order to reproduce the normal phase of action the projection will have to be at the rate of sixteen pictures per second.

Although, on the one hand, it is possible to take negative records at twice the speed, and, on the other hand, to project them at half the speed, there are great disadvantages in such procedure, for technical reasons; first, the speed in the taking of the negative records must necessarily be not less than thirty-two pictures per second because at half the speed projection will have to be in similar ratio less than sixteen pictures per second. This latter second factor involves substantial disadvantages, well known in the science of motion pictures, that to effect perfect illusion of motion pictures by persistency of vision, the speed of projection must not be less than sixteen pictures per second. Besides, there is another disadvantage from that in the so-called "shutter flicker" which is very disturbing when the projector is run at a slower speed than sixteen pictures per second, therefore it is necessary to take the negative records at not less than thirty-two pictures per second. This limits the taking of the records to ideal light conditions only, because when taking pictures at a fast speed when light conditions are not ideal then the negative panchromatic film is not sufficiently sensitive to register amply exposed color selected images when, in order to obtain proper color selection, sufficiently dense color filters are employed in the taking. To obviate the disadvantages above described and to be able on projection to the screen to correctly reproduce the speed of very phase of action registered in the negative film, and to take the records at a slower speed, and to project the positive records printed therefrom on both sides of a double coated positive film, at the same speed at which these records were taken and yet preserve the normal phase of action, the novel step below disclosed is utilized.

By this novel step each individual color selected image area of the negative record representing a successive phase of action is duplicated in printing upon two adjoining image areas of the double coated positive film, thus forming twice as many positive records as there were in the negative, these records being arranged in printing on both sides of the positive, having on each side a sensitive coating.

As it is generally preferred, to separate in printing, the images of short wave length on one side and the images of long wave length on the opposite side of the film, by employing this novel step there will be twice the number of records of short wave length on one side of the film and twice the number of records of long wave length on the opposite side of the film.

In the accompanying drawings.

Figures 1, 2, 3:
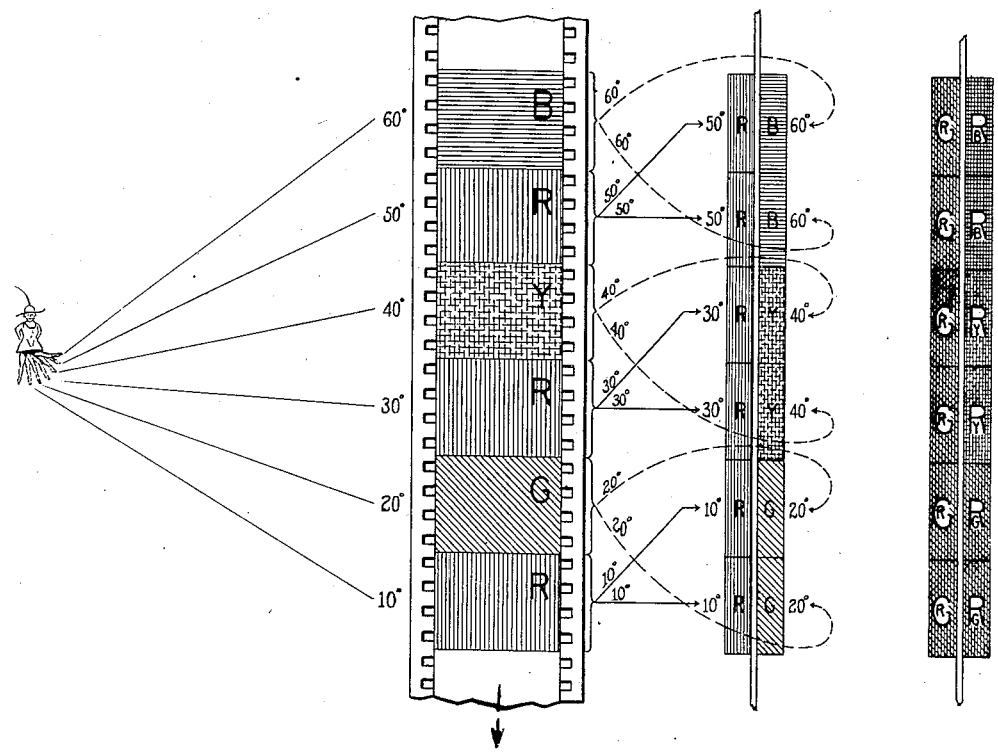
Figure 1 is a face view of the negative record in conjunction with a dancing figure, expressing diagrammatically successive phases of action in advancing degrees.
Figure 2 is an edge view of a positive record having coatings on both faces and shown in printing relation to the negative illustrated in Figure 1.
Figure 3 is a similar view of the same with the respective color values indicated in capital letters of small size, and the color tints indicated in capital letters of larger size.

Referring to Figure 1, the six phases of action incident to the dancing figure raising one leg are represented in the degrees 10°, 20°, 30°, 40°, 50° and 60° on the color selected image areas of the negative marked by the initial of the corresponding colors red, green; red, yellow; red and blue. The first, third and fifth phases of the action 10° red, 30° red and 50° red are reproduced in duplicate and successively on the coating on the left-hand face of the diaphanous web of the positive record shown in Figure 2, while the second, fourth and sixth phase of action 20° green, 40° yellow, and 60° blue are reproduced in duplicate and successively on the coating on the right-hand face of the said diaphanous web with the duplicate images 20° green in register with the duplicate images 10° red, the duplicate images 40° yellow in register with the duplicate images 30° red, and the duplicate images 60° blue in register with the duplicate images 50° red.

Thus by the arrangement shown and described there are twice as many positive records as there are on the negative and twice the number of short wave lengths appear on one face of the web of the positive record and twice the number of long wave lengths appear on the other face of the said web. It will also be noticed that alternate phases of action, of which one is represented in two of the same color value records of short wave length, and the other in two of the same color value records of long wave length, are in registry with each other.

To make it perfectly clear, I will take, for example, an instance, where in the taking of the negative records, alternately red and green color filters are used and from such a negative record a print is made on double coated positive film, accomplished by first imprinting in duplicate each of the red images successively on one side of the film and next in the same manner the green images on the opposite side; when developed, this film will show each of the red images in overlying registry with a green image, each given two adjoining successive images of red value on one side of the film being a duplicate of one phase of action, and the overlying two adjoining successive green images on the opposite side of the film being a duplicate of the next successive phase of action. By the duplicating step each two phases of action contained in overlying registry are repeated in projection and thus retard the accelerated action occurring when employing a regularly printed film when projected at the same speed as one used in the taking.

It has been found that by persistency of vision the duplicated phases merge and synchronize in the eye to perfection. Thus, this novel method of printing a double coated positive film for projection of color motion pictures permits the taking of the negative records at a slower speed than thirty-two pictures per second, thus insuring ample exposure of the color selected images and preserving the normal phase of action upon projection.

By being in a position to take the records at a slower speed, the images are of good detail and perfect color gradation, which is of great value when these records are printed on the positive film and tinted or dyed into their respective colors, the true hues of color being correctly represented in each image on projection.

The novel step herein described can be applied to methods where at least two color filters are used in taking the negative records, and whether or not the color filters used are complementary, non-complementary or both.

The applicant prefers to employ this step in connection with the method of taking color selected records forming the subject matter of his prior Patent, No. 1,289,940, wherein red-green, red-yellow and red-blue color filters are used in taking the successive negative records.

The filters are arranged to register successive groups of six color selected pictures, each group consisting of three pictures of long wave length and each being of red selection only, and the other three pictures of the group are of short wave length and consist of green, yellow and blue selection, respectively, and arranged that one picture of the long wave length alternates with one of the short wave length thus forming successive records of red, green; red, yellow; and red, blue.

To effect this special step in printing from the negative record above described upon a double coated positive film, a suitable printing machine is employed to effect the necessary advancement of the negative and positive films. The images of red color selection are printed on one side of the film and the images of green, yellow and blue color selection are printed on the opposite side of the film, care being taken that the right and left of the images of the first and second printings are synchronized. It is understood that I do not limit myself to the above sequence of printing.

If desired the printing step may be carried out by an intermediate step as follows: A single coated film is first employed to register double the number of images of each negative image from which it is printed. This accomplished, the next step would be to print on one side of a double coated positive film the images of red color selection, and to print on the other side of the double coated positive film the images of green, yellow and blue color selection.

After the double coated positive film is printed as described above, it shows each successive group of six negative records duplicated into twelve records on the positive film; six of the twelve duplicated records are on one side of the double coated film and represent the images of red color selection only, and the other six duplicated records are on the other side of the double coated film in overlying registry with those first printed, and represent, in succession, two images of green, two of yellow and two of blue color selection, respectively; thus, some of the combined areas form values that are complementary and some that are non-complementary. Each successive group consists, therefore, in four overlying pairs of complementary color value and two overlying pairs of non-complementary color value records.

Thus in the successive group of twelve records two given adjoining red color records on one side of the film represent one and the same phase of action and overlie in registry, exactly with the perforations, two adjoining either green, yellow or blue color value records on the opposite side of the film; the respective two color value records of short wave length present also only one and the same but the next successive phase of action to their respective records of red value.

For illustrative purposes, it is preferred that the positive images from the negative red value records should bear green color, and images from the green, yellow and blue values, respectively, bear red color. The red color in the image area of yellow color selection will be deficient in red because the image parts selected by the yellow record necessarily carry color selections that are also representing red and green values. However, this deficiency in red has a remarkable and desirable effect upon projection with the next successive pairs; it seems to neutralize into delicate color shades which is not possible to obtain if only complementary records are employed.

In projection of these six successive series of color images, color mixtures of intermediate hues and shades, due to respective relative densities of the partially opaque or transparent particles composing the images, are produced in various proportions which cannot possibly be obtained in such a way by any other method proposed heretofore. The pairs being in duplicate permit a great variety of color manipulations, so that one phase of action expressed in two adjoining and successive picture areas of long wave on one side can be used with advantage in coloring by coloring one of the picture areas, for instance, a pure red shade and the other picture area of the same phase of action an orange-red, and similarly with the other side of the film by tinting the pictures into blue-green and yellow-green shades, respectively.

To convert the projecting positive film into color, any of the many well known and published suitable formulas may be selected to either render the positive images bleached and converted into color by metalic salts, reference being made to Dr. Sedlaczek's work "Die Tonungsverfahren von Entwieckelungzspapieren" published in Halle, 1906, or the gelatine image may be bleached, hardened or partially hardened and made discriminately receptive of either aqueous or oily color fluids. To characterize one of the types of these bleaches reference is made to the publication by Dr. Mayer, "Das Bromöldruckverfahren" (Encyklopädie der Photographie) published in Halle, 1912, or an iodide bleacher referred to in the "Email Photographie" by K. Schwier, published in Leipzig, 1902, page 50, may be employed. This bleacher converts the silver image into an iodide, the converted iodide image acts as a mordant to select colors, the remaining image being easily fixed out in a solution of hypo or the like. Also positive color elements may be obtained by imprinting a negative image and bleaching with hydrogen peroxide, ammonium persulphate or an equivalent, this will dissolve the image and leave a positive relief, which can be stained with aqueous color dyes; and addition of a chromatum can be introduced to facilitate the fixing of certain colors. Basic or acid dyes or combinations of both can employed with respect to the tanned effect, of the selected bleaching method, upon the gelatine of the images. All these bleaching and toning methods, as such, are in no way claimed here, being already in publications and well known to those skilled in the art, but they are described here in relation or in combination with the other special features of the hereindescribed invention.

For commercial reasons it may be desirable to simplify the manipulations and bleach the positive film in one operation. This may be done after the film is developed, fixed and dried by winding the film on a rack and immersing in tanks filled with bleaching solutions, or if more suitable each sensitive side of the film can be bleached separately by winding the film upon a drum to protect one side of the film while the other side is being treated. This drum may be so constructed that its outside periphery presents a springy cushion effect of water resisting material and the film when applied under required tension imbeds itself into this cushion sufficiently to protect one side against solutions.

The bleaching accomplished, the film is dried and wound on the drum as described, preventing one side of the film from touching solutions while the other side is undergoing coloring. After fixing the dye and drying the film the other side is treated to color complementary to the first one, the dye fixed and dried.

The positive film is then ready for projection in colors in a standard projector at the same rate of speed as the negative records were taken, without accelerating the phases of action. Thus the negative records can be given more exposure in the ordinary camera equipped with color filter means and the positives made therefrom are projected at the same speed as they were taken, which brings a decided advantage in motion pictures in color, when a double coated positive film is used in printing, producing images of more details, and better color rendering due to the proper exposure given to the images, thus facilitating the taking of moving pictures in colors, without being limited to ideal light conditions, heretofore required.

Where used in the specification and in the appended claims, the expression "in register" or "in registry," as "in registry with the images," "in registry with each other," "in overlying registry," "in overlying registry with perforations" and "in overlying registry exactly with perforations" it is intended to mean such exactness of registration as may be necessary to produce the desired congruence of the images or image pairs when viewed by projection on a screen.

Having thus described my invention, I claim as new and desire to secure by Letters Patent:

1. As an article of manufacture, a photographic record for producing motion pictures in color, comprising a diaphanous web and coatings on the faces of the web, both coatings bearing successive pairs of images, each given pair on one side being of one color value and representing only one phase of action and the next following phase of action being represented in the given pair of images of another color value on the other side of the web in registry with the first mentioned images.

2. As an article of manufacture, a photograpic record for producing motion pictures in colors, comprising a diaphanous web provided on each face with a coating, both coatings bearing images of successive phases of action in duplicate, one of the coatings having duplicate images of one phase of action in a color value of short wave lengths, the other coating having duplicate images of the next seccessive phase of action in a color value of long wave lengths, the said images forming the successive phases of action on the two coatings being in register.

3. The method of producing motion pictures in color, comprising as a step duplicating in printing a negative image area representing one phase of action of one color selection into two adjoining image areas on one side of a double coated positive film, and duplicating in printing into two adjoining image areas on the opposite side of the positive film in overlying registry with perforations of the first said two images, another negative image area of another color selection representing the next successive phase of action to first mentioned negative image area.

4. The method of producing motion pictures in colors, comprising as a step, printing from a negative record, bearing red, green, yellow and blue color selected images each representing a successive phase of action, double the number of images of each phase of action of red color selection into two adjoining image areas on one side of a double coated positive film, and printing into two adjoining image areas on the opposite side of the positive film double the number of images of each phase of action of green, yellow and blue color selection respectively, two given adjoining image areas of red color selection on one side of the positive representing only one and the same phase of action and being in overlying registry with the perforations of two given adjoining image areas of either green, yellow or blue color selection respectively and also representing only one but the next successive phase of action to first said two.

5. A double coated positive record characterized by bearing in both coatings collectively twice the number of color selected images of each of the negative record, from which it is printed, two given adjoining images on one side of the record representing only one and the same phase of action, and two given adjoining images overlying in registry with the perforations of the first said two on the opposite side of the film also representing only one but the next successive phase of action to the first two.

6. A photographic double-coated strip comprising images in alternate pairs of long and short wave length values, the images on one side of the film being of color selection of long wave length and on the other side of the film overlying in registry with the perforations are images of color selection of short wave length, each two adjoining images of long wave length presenting only one phase of action, and each two adjoining images of short wave length overlying in registry with the first said two, presenting also only one but the next successive phase of action.

7. A double coated positive record for use in producing motion pictures in colors, comprising overlying pairs of adjacent image areas in registry with the perforations, each of the said pairs on one side of the record consisting of two adjoining image areas of the same color value representing one phase of action and bearing the same color tint, a pair of the image areas on the other side of the record consisting of two adjoining image areas of another color value and registering with the said first pair of images on the other side, and also representing only one and the same but the next successive phase of action and bearing a complementary color tint.

8. A double-coated positive record characterized by bearing, in both coatings, collectively twice the number of color selected images of each of the negative records from which it was printed, two given adjoining images on one side of the positive record representing only one and the same phase of action, and overlying in registry with the perforations of the said two given adjoining images on one side of the positive record are two given adjoining images on the other side of the positive record and also representing only one and the same but the next successive phase of action to the first two, the said adjoining images on one side of the positive record bearing a color different from the said registering adjoining images on the other side of the positive record.

9. In the art of color motion pictures, the step for producing double-coated color projecting positives for projection at the same rate of speed as the negative was taken without accelerating the normal phase of action which consists in producing on a double-coated positive film double the number of color selected image areas of a negative film by imprinting each successive color selected image area of the negative film into each of two adjoining image areas of the double-coated film, each two given adjoining image areas on one side of the film representing only one and the same phase of action, and overlying in registry with the perforations of the said two given adjoining images on one side of the film are two given adjoining image areas on the opposite side of the film and which also represent only one but the next successive phase of action of the said first two image areas.

10. A double-coated positive record for use in producing motion pictures in colors, comprising twice the number of images of each phase of action contained in the film from which it is printed, each two given adjoining images on one side of the film representing only one and the same phase of action, and two given adjoining images on the opposite side of the film representing only one but the next successive phase of action of the said first two images and overlying in registry with the perforations of the said first two given adjoining images.

11. A double-coated motion picture color projecting positive record bearing in both coatings collectively twice the number of color selected images of each of the negative record, one side bearing images of red selection, the opposite side bearing images of green, yellow and blue color selection, respectively, each two given adjoining images on one side of the film representing only one phase of action and each two given adjoining images overlying in registry with the perforations of the first mentioned two on the opposite side of the film, representing also only one but the next successive phase of action to the first mentioned two images, all the images of phases of action of red selection showing a green color and the images of green, yellow and blue color selection respectively each showing a red color tint.

12. In color motion pictures, a method for preserving the normal phase of action when projecting a double-coated positive film at the same rate of speed as was used in taking the negative records, which includes recording on a negative film color selected images of phases of action in successive groups of six, three of each six being selective of colors of short wave length and three being selective of colors of long wave length, and printing therefrom a double-coated positive film in which each image of the first film is duplicated by being printed in each of two adjoining image areas of the double-coated positive, arranging the images in printing of the positive in such a manner that each two given adjoining images on one side of the film are representing only one phase of action, and each two given adjoining images overlying in registry with the perforations of the first mentioned two on the opposite side of the film are representing also only one but the next successive phase of action to the first mentioned two images, applying to all the image areas of long wave length selection one color tint and to all the images of short wave length selection a complementary color tint.

13. In color motion pictures, a method for preserving the normal phase of action when projecting a double coated positive film at the same rate of speed as was used in taking the negative record, which includes recording on a negative film color selected images of phases of action in successive groups of six, three of each six being selective of colors of short wave length and three being selective of colors of long wave length and printing therefrom a double coated positive film in which each image of the first film is duplicated by being printed in each of two adjoining image areas of the double-coated positive, arranging the images in printing of the positive in such a manner that each two given adjoining images on one side of the film are representing only one phase of action, and each two given adjoining images overlying in registry with the perforations of the first mentioned two on the opposite side of the film are representing also only one but the next successive phase of action to the first mentioned two images, applying to the image areas of short wave length selection and the image areas of long wave length selection different color tints.

14. In color motion pictures, a method for preserving the normal phase of action when projecting a double coated positive film at the same rate of speed as was used in taking the negative records, which includes recording on a negative film in an ordinary taking camera equipped with color filters, color selected images of phases of action in successive groups of six, three of each six being selective of colors of short wave length and each consisting of green, yellow and blue color selection, respectively, and three being selective of colors of long wave length and each consisting of red color selection only, each of the images of short wave length alternating with an image of long wave length, printing therefrom a double-coated positive film with twice the number of images of each phase of action into two adjoining image areas of the positive, said areas being arranged, in printing, the red values on the sensitive coating of one side of the film and the green, yellow and blue values respectively on the sensitive coating of the opposite side of the film, each given two adjoining images of red value representing only one and the same phase of action and being in overlying registry with the perforations of two given adjoining images of either green, yellow or blue value respectively also representing only one but the next successive phase of action, developing, fixing and washing the film, drying and immersing in solutions to render the image areas capable of coloring and dye absorbing, drying the film, coloring the areas of each image on one side of the film into one color and the image areas on the opposite side into another color, and fixing the dye images whereby the positive film may be projected at exactly the same rate of speed at which the negative records were taken without accelerating the normal phases of action.

JOSEPH SHAW.